United States Patent [19]
Lionet

[11] 3,968,730
[45] July 13, 1976

[54] METHOD OF AND APPARATUS FOR SYNCHRONIZING A PLURALITY OF FLUID-OPERATED RAMS

[76] Inventor: Bernard Lucien Gabriel Lionet, 72, rue Francis de Pressense, Villeurbanne, France

[22] Filed: May 13, 1974

[21] Appl. No.: 469,304

[52] U.S. Cl. ................................. 91/171; 91/361
[51] Int. Cl.² .................... F01B 25/04; F15B 11/22
[58] Field of Search .................. 91/171, 363 A, 361

[56] References Cited
UNITED STATES PATENTS

| | | | |
|---|---|---|---|
| 2,367,580 | 1/1945 | Hines | 91/171 |
| 2,378,497 | 6/1945 | Phillips | 91/171 |
| 3,377,924 | 4/1968 | Spencer et al. | 91/171 |
| 3,505,929 | 4/1970 | Coppola et al. | 91/363 A |

*Primary Examiner*—Paul E. Maslousky
*Attorney, Agent, or Firm*—Karl F. Ross; Herbert Dubno

[57] ABSTRACT

A plurality of fluid-operated rams, e.g., for positioning the rolls of a sheet-metal bending machine, are each actuated by a respective servovalve and are each connected to a respective potentiometer whose output resistance varies in accordance with the position of the ram. The rams are grouped in pairs and one potentiometer of each pair is energized with positive voltage, the other with negative voltage so that a combined signal can be produced indicating the relative positions of the two rams of the pair. The combined signal representing the position deviation is fed to two separate amplifiers where it is combined with voltages of opposite polarity and then fed to the servovalves of the pair of rams. Thus the one servovalve is closed partially if its ram advances on the other ram. Similarly a plurality of such rams can be interconnected with all but at most two rams from two different pairs so that all ram positions will be equalized.

6 Claims, 3 Drawing Figures

3,968,730

METHOD OF AND APPARATUS FOR SYNCHRONIZING A PLURALITY OF FLUID-OPERATED RAMS

FIELD OF THE INVENTION

The present invention relates to a method of and an apparatus for synchronizing hydraulic or pneumatic rams.

BACKGROUND OF THE INVENTION

It often happens that several hydraulic or pneumatic rams should have synchronized movements, i.e., that their positions should be the same or should be staggered by the same value at any instant. This is particularly the case with rams which move the cylinders of machines for bending sheet metal.

To achieve very accurate synchronization, it has been found inadequate to control the rams identically, for example by coupling them in parallel or by connecting them by bars which, although rigid, undergo twisting in operation. It is necessary to provide a control system provided with a regulator capable of comparing the positions of the rams at any instant.

OBJECTS OF THE INVENTION

It is therefore an object of the present invention to provide an improved method of and apparatus for synchronizing a plurality of fluid-operated rams.

Another object is the provision of an improved hydraulic or pneumatic system where the various rams are automatically synchronized.

SUMMARY OF THE INVENTION

These objects are attained in a system according to the present invention having at least two rams each operated by a servovalve in turn controlled by an amplifier and capable of opening to a greater or lesser extent or of closing according to the level of its input which is equal to the algebraic sum of a reference control signal for controlling the displacement of the rams and of at least one correction or deviation signal obtained at the output of a comparator and representing the difference in position of the two rams, a difference which is detected by position detectors associated with each ram.

The servovalves in accordance with this invention open partially, or completely or even close in order to keep the rams in the same position or staggered by the same distance at any instant. The smallest difference detected causes a corrective action which is, for example, proportional to this difference.

According to a feature of the invention, the various signals fed to and generated by the comparators are all electrical analog (continuous) signals, the opening of the servovalves being controlled by a voltage generated by the corresponding amplifier which receives a signal constituting the algebraic sum of two control signals coming from a branch of the circuit controlled by a switch, and the other a correction signal coming from the output of at least one comparator and constituting the algebraic sum of signals generated by two position detectors connected to the respective comparator.

According to a particular feature of this method, the rams are grouped in pairs and the position detectors of two rams of each pair are energized, one with a positive voltage or current and the other with a negative current or voltage. The sum of the voltages received at the outputs of the detectors is compared with a zero reference voltage or current by the comparator associated with the pair of rams in question, this zero voltage or current constituting a control point.

At the output of this comparator one receives a positive or negative voltage according to whether one of the rams is in an advanced position with respect to the other. A zero output corresponds to the positions being identical.

The detectors of the two rams of each pair may also be energized one with a positive voltage and the other with a negative voltage and the sum of the voltage received at the output of the detectors is compared with a reference signal which is not zero by the comparator associated with the pair of rams in question. This reference value which is not zero is representative of a staggering of position of the two rams. Its sign corresponds to the desired direction of stagger. The synchronization thus consists of keeping this stagger constant. Advantageously, this stagger may be controlled by means of a potentiometer.

In the case where at least two pairs of rams are provided, the synchronization is carried out by comparing two rams of the same pair and two separate pairs of rams.

Thus, for four rams grouped in two pairs, the two rams of each pair are synchronized by the above-mentioned method and the two pairs are compared by comparing two rams, one from each pair, by means of an additional comparator providing a correction magnitude fed to the input of the two amplifiers controlling the servovalves corresponding to the rams of the pair in question.

It is advantageous to give the additional comparators a greater gain than the gain of the comparators of each pair, for example a double gain, in order that the action of an additional comparator is never canceled by that of a comparator associated with two rams of the same pair.

According to another feature of the invention, the rams are not associated in pairs, their number being either even or odd. In this case, the rams are compared in a chain or loop by means of comparators of the same gain each associated with two rams and which each send a correction signal to the input of the two amplifiers controlling the servovalves corresponding to the two compared rams. In a loop each position signal is fed to two separate comparators whereas in a chain the position signals of two end cylinders are each only fed to a single comparator.

According to a further feature of this invention the position detector of each branch of the chain or loop is constituted by a variable resistor incorporated in a resistance bridge connected to the input of an amplifier whose output signal, depending on the value of the variable resistor, is sent to the comparator or to the two comparators associated with the ram in question.

In this case electrical outputs are not compared, but the comparison is made between values of resistances. The comparators act in the same manner on the servovalves as described above.

Advantageously, an adjustable resistor is connected in series with the variable resistor of each detector to make it easy to stagger two rams. The stagger may thus be chosen freely for each ram, which is not possible in the case where the rams are connected in pairs. This solution makes it possible, for example, to incline the line joining the ends of three rams to form cones in machines for bending metal sheets.

According to another feature of the invention, the connection between each amplifier and the corresponding servovalves is made by two electric leads connected in parallel and each provided with a diode such that only currents of opposed direction may pass therethrough and with a signal controlled by the action on the switch controlling the rams. Either of these two leads is energized according to the direction of movement of the rams, the reversal of this direction of movement being directed by the reversal of the control currents supplied by the direction switch. In this way, the rams are perfectly synchronized in both directions of movement, for example moving up and down.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
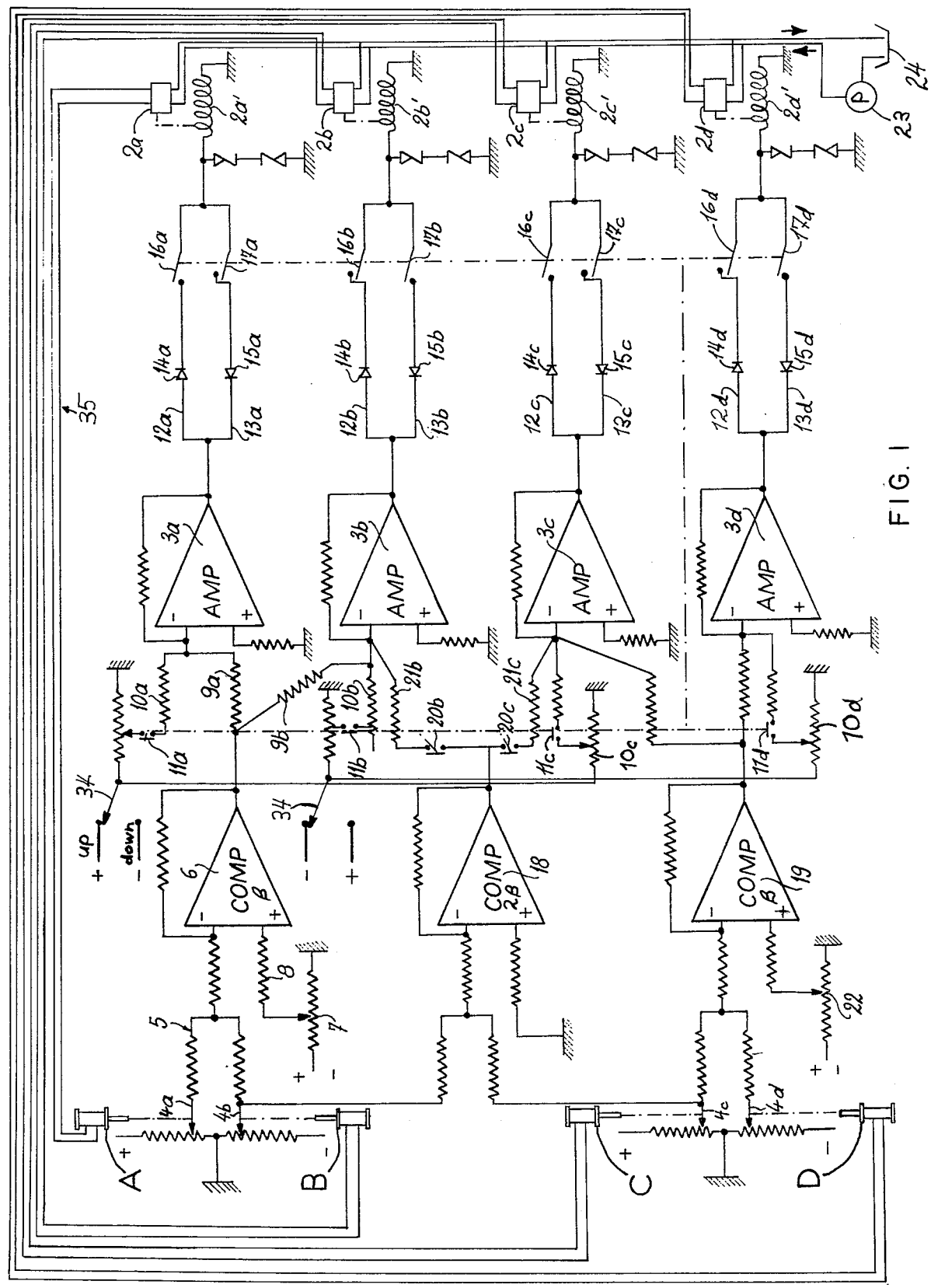
FIG. 1 is a schematic diagram of an electrical circuit used in a chain configuration with four rams grouped in two pairs.

In FIG. 1, four rams A, B, C, D are connectable through lines 35 to a pump 23 or reservoir 24 by servovalves 2a, 2b, 2c, and 2d respectively, as described in chapter 11 of *Servomechanism Practice* by Ahrendt and Savant (McGraw Hill: 1960). Each of these valves is controlled through a respective solenoid 2a', 2b', 2c', and 2d' by an amplifier, 3a, 3b, 3c, and 3d, respectively. Associated with the rams A, B, C, D are position detectors 4a, 4b, 4c and 4d respectively.

The rams are connected in pairs and the method of synchronization is the same for all pairs. The following description refers to the pair including rams A and B, as an example, and also applies to the pair including rams B and C, and C and D.

The position detectors 4a and 4b of the rams A and B are fed with signals having voltage levels regulated to a millivolt, one of which is positive (ram A) and the other negative (ram B).

At any instant, an adder circuit 5 forms the algebraic sum of signals generated by the two detectors 4a and 4b. This algebraic sum is compared with a reference value by a comparator 6 whose gain is $\beta$ to produce a deviation signal proportional to the difference between the positions of the two rams A and B, with reference to a signal fed to its other input through an input resistor 8 from a potentiometer 7.

At its output, the comparator 6 produces a positive or negative signal depending on the relative positions of the rams A and B. Thus, if the potentiometer 7 is set to deliver a zero potential, and if a negative signal is fed to the input of the comparator 6 a positive signal will appear at its output.

In this case, a negative signal at the output of the comparator 6 indicates that the ram A has risen further than the ram B and a positive signal indicates that the ram B has risen further than the ram A. No signal indicates that the two rams A and B are in the desired relative positions.

Two circuit branches 9a and 9b make it possible to send this so-called correction or deviation signal to the inputs of amplifiers 3a and 3b. The signals in these branches 9a and 9b are added to control signals in the branches 10a and 10b in which are connected ganged switches 11a and 11b.

The signals in the branches 10a and 10b are of opposite polarity for example positive for the ram A and negative for the ram B, in the case of the ascent of the rams and positive for the ram B and negative for the ram A in the case of the descent of the rams. A pair of ganged SPDT switches 34 serve to connect the control-signal circuits 10a and 10c to a positive source and circuits 10b and 10d to a negative source, and vice versa.

The connection between each amplifier and the corresponding servovalve is made by two parallel conductors 12a and 13a for the ram A, 12b and 13b for the ram B and so on. Connected in each of these conductors is a diode 14a, 15a – 14d, 15d and a switch 16a, 17a – 16d, 17d. Each of the diodes of each pair, 14a and 15a, 14b and 15b, 14c and 15c, and 14d and 15d has its polarity opposite to that of the other. The switches 16a and 17a – 16d and 17d are ganged with the switches 34.

The servovalves 2a – 2d are controlled by a positive or negative D.C. voltage, for example a maximum of +5 volts for the ascent and −5 volts for the descent, or vice versa.

To bring about the ascent of the rams A and B, the switches 11a and 11b are closed. At the same time, the contacts 17a and 16b close, so that the valve 2a is supplied with negative voltage only and the valve 2b with positive voltage only.

If the ram A has risen further than the ram B, there is a positive voltage at the input of the comparator 6 and a negative voltage at its output, which opposes the positive signal applied to the input of the comparator 3a subsequent to the closure of the contact 11a by the switch 34.

A slight difference in position of the two rams A and B decreases the voltage applied to the amplifier 3a, which causes the partial closure of the valve 2a, whereas the valve 2b continues to be activated normally. When the two rams have substantially reached the same level, the valve 2a opens fully and synchronization is thus achieved.

To drop the rams A and B the switches 34 are actuated and the switches 11a and 11b are closed so that the voltages in the branches 10a and 10b have their polarities reversed with respect to the ascent direction. At the same time, the switches 16a and 17b close such that the valve 2a can only be fed a positive voltage and the valve 2b a negative voltage.

If the ram A descends more quickly than the ram B, a negative voltage is applied to the input of the comparator 6 and a positive voltage appears at its output to oppose the negative voltage applied to the input of the comparator 3a subsequent to the closure of the contact 11a.

A slight position difference lessens the voltage applied to the amplifier 3a, causing the partial closure of the valve 2a.

There are still two other possibilities not described above: if the ram A ascends less quickly than the ram B, the valve 2*b* is closed; and if the ram A descends less quickly than the ram B, the valve 2*b* also closes.

In order to compare the four rams so as to synchronize them the two pairs of rams A–B and C–D are synchronized independently by the above-described method and the rams of the two pairs are compared by the intermediary of the pair of rams B–C which comprise a ram of each pair. This comparison takes place by means of an additional comparator 18, having a gain equal to 2 β, i.e., double the gain β of the comparator 6 of the comparator 19 associated with the position detectors 4*c* and 4*d*. The additional comparator 18 is connected between the position detectors 4*b* and 4*c* and the amplifiers 3*b* and 3*c* in the same way as the comparators 6 and 19.

Switches 20*b* and 20*c* connected in the branches 21*b* and 21*c* coming from the additional comparator 18 and respectively leading to the amplifiers 3*b* and 3*c*, make it possible to disconnect the two groups of rams A–B and C–D from each other, so as to be able to synchronize the rams of each group independently if desired.

The double gain of the comparator 18 is provided so that a small difference between the rams B and C succeeds in lessening the voltages at the outputs of the amplifiers 3*b* or 3*c*, despite possible contrary effects of the comparators 6 and 19. An example will make it easier to understand the operation of the arrangement.

If the ram A is blocked in the working position by a strong force with the valve 2*a* open, the valve 2*b* closes under the action of the synchronization device belonging to the rams A and B. It will be noted that since they have no force to overcome, the rams C and D continue to rise.

The comparison of the positions of the rams B and C takes place by means of the additional comparator 18. Since the ram C has risen further than the ram B, a negative voltage is created by the output of the comparator 18. This voltage has the effect of closing the valve 2*c*. Due to its double gain, this regulator is twice as sensitive as the devices belonging to each group of two rams.

Since the valve 2*c* is closed, only the ram D continues to rise slightly, until the comparator 19 supplies a positive output voltage sufficient to close the valve 2*d*.

With a method of this type, the difference in position between the ram A and the ram D may be made less than 0.1 mm as a result of a judicious choice of the gains of the amplifiers used.

For three pairs of rams, or even more, it is necessary to provide additional comparators similar to the comparator 18. The method thus consists of comparing the positions of two separate pairs of rams in as many pairs is necessary, by the intermediary of pairs of rams chosen from two separate pairs. The additional comparators provide a correction factor which is applied to the inputs of the two amplifiers controlling the servovalves corresponding to the rams of the pair in question.

The rams A, B, C and D may thus be synchronized, while retaining a certain stagger, for example as regards their relative heights. It is thus possible to obtain a stagger of the same valve between the rams A and B, on the one hand and the rams C and D on the other hand, the rams B and C remaining lower than the rams A and D.

To achieve this, the potentiometer 7 is set to feed a reference voltage to the comparator 6 at a potential which is not zero, but positive and the similar potentiometer 22 of the comparator 19 at a negative potential of absolutely the same value.

It is possible to program the upwards or downwards stoppage of each group of rams by means of an external indicator device.

Figure 2:
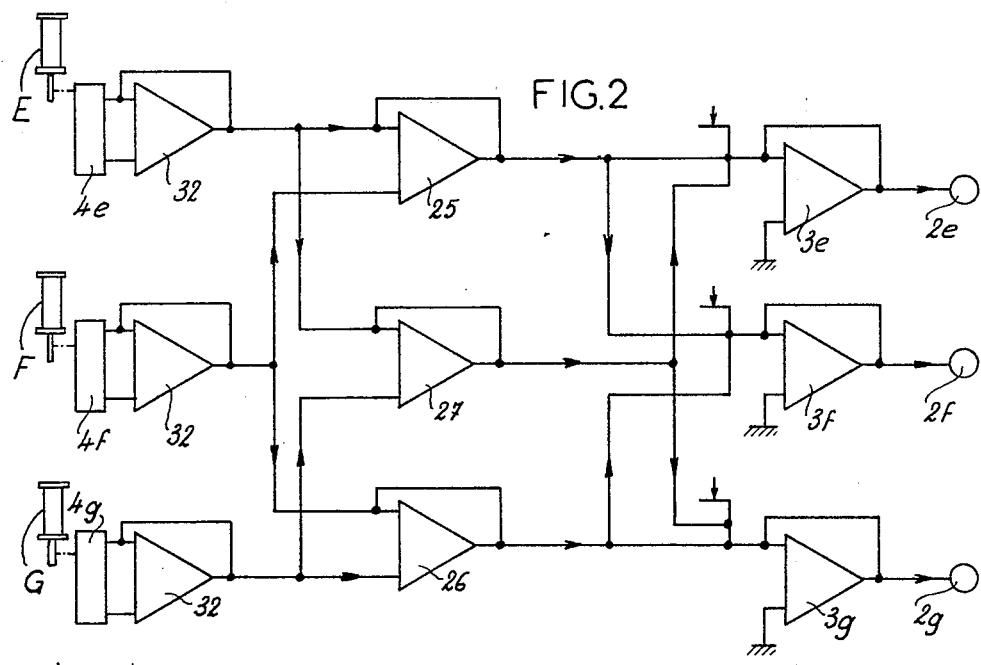
FIG. 2 is a simplified schematic diagram of an electrical circuit used with three rams connected in a loop.

In FIG. 2, the three rams are designated by E, F, G. Their supply devices, the servovalves 2*e*, 2*f*, 2*g* respectively, and the amplifiers 3*e*, 3*f*, 3*g* respectively, are similar to those previously described for the rams A, B, C and D. This second arrangement differs in the construction of the position detectors 4*e*, 4*f*, 4*g* and in the connection of the three comparators 25, 26 and 27.

Figure 3:
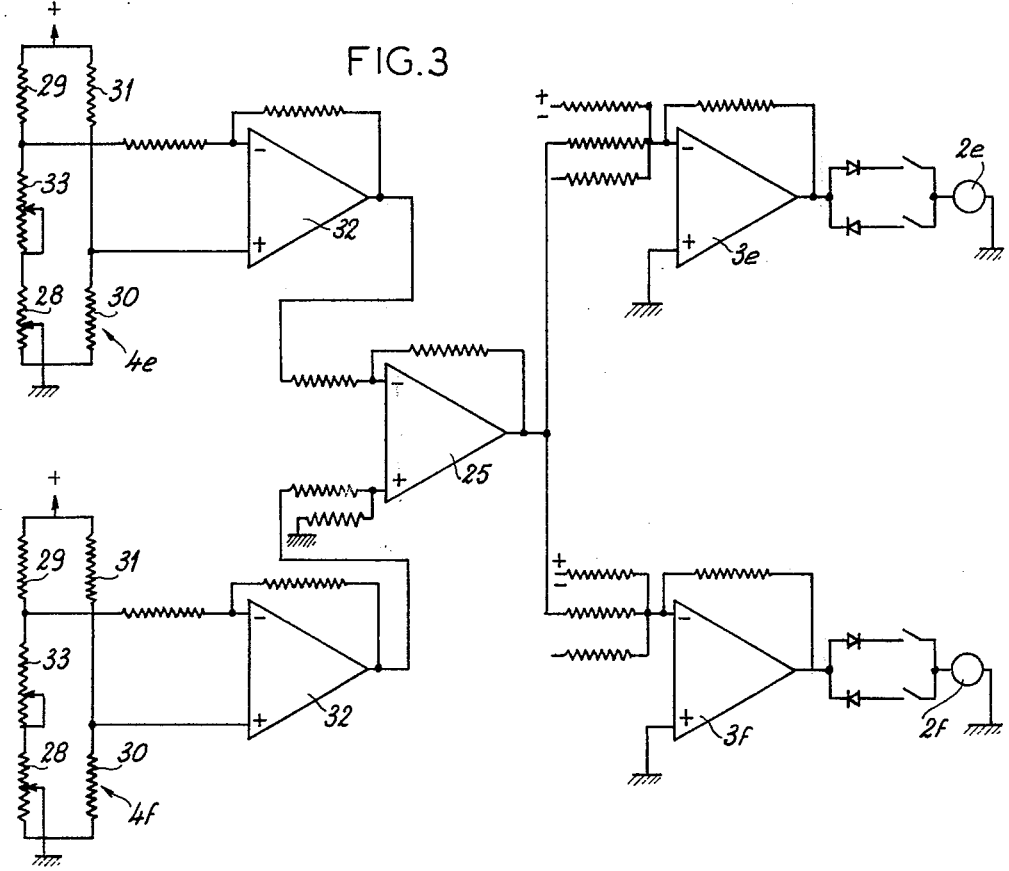
FIG. 3 is a schematic of a detail of the circuit of FIG. 2 and in particular shows how two of the three rams are compared with each other.

The detectors 4*e*, 4*f* and 4*g*, shown in detail in FIG. 3, are each constituted by a linear variable resistance 28 as shown on page 50 of *Servomechanism Practice* by Ahrendt and Savant (McGraw-Hill: 1960), incorporated in a resistance bridge 28, 29, 30, 31. The bridge is energized at diagonal corners and the opposite diagonal corners are connected to a linear amplifier 32 whose output is a voltage proportional to the value of the variable resistance 28.

The comparison of positions of the three rams E, F, G takes place in a loop, the three comparators 25, 26, and 27 have the same gain and are each connected to a different pair of rams. The comparator 25 receives signals from the rams E and F, the comparator 26 receives signals from the rams F and G, and the comparator 27 receives signals from the rams E and G. Each comparator sends a correction signal to the inputs of the two amplifiers controlling the servovalves corresponding to the two compared rams. Thus, the comparator 25 acts on the amplifiers 3*e* and 3*f*, the comparator 26 acts on the amplifiers 3*f* and 3*g* and the comparator 27 acts on the amplifiers 3*e* and 3*g*.

This loop arrangement may be replaced by a chain connection, which is not closed on itself. The loop connection is generally more accurate.

An adjustable resistance 33 is connected in series with the variable resistance 28 in each of the position detectors. For staggering two rams, one need only reset the variable resistance 28 by a certain fixed value by means of the adjustable resistance 33.

For more than three rams, the comparison of the rams is undertaken in twos, thus describing a loop. The method may be applied to any number of rams, either even or odd.

The invention relates particularly to rams of machines for bending metal sheets. In these machines, cylinders must be displaced vertically while remaining strictly parallel to a certain direction, either horizontal or inclined. Each cylinder is displaced by two rams or more. The possibility of staggering the rams according to the method described above makes it possible to incline a cylinder for shaping cones. In this respect, the second embodiment of the method corresponding to FIGS. 2 and 3 is advantageous since it makes it possible to incline the line joining the ends of three or more rams.

Naturally, the invention is not limited to the embodiments described above. For example in the preceding examples positive and negative voltages are used simultaneously, but it is possible to control all the servovalves by voltages of the same polarity, positive for the ascent and negative for the descent or vice versa. Moreover, any voltage may be used for controlling the servovalves, and is not limited to +5 or −5 volts as described in the examples. For controlling valves having an operation voltage greater than 12 volts, and a consumption greater than 25 mA, it is advantageous to use a transistorized arrangement.

I claim:

1. A method of synchronizing at least three rams each controlled by a respective servovalve, said method comprising the steps of:
   generating a respective analog position signal for each of said rams corresponding to the position thereof;
   algebraically combining the position signal for a first of said rams with the position signal for a second of said rams and comparing the resulting combination with a reference signal to produce a first primary analog deviation signal and operating the first ram therewith;
   algebraically combining the position signal for the second ram with the position signal for a third of said rams and comparing the resulting combination with a reference signal to produce a second primary analog deviation signal and operating the third ram therewith; and
   algebraically combining the primary deviation signals and comparing the resulting combination with a reference signal to produce an analog secondary deviation signal and operating said second ram therewith.

2. A method of synchronizing at least four rams each controlled by a respective servovalve, said method comprising the steps of:
   generating a respective analog position signal for each of said rams corresponding to the position thereof;
   algebraically combining the position signal for a first of said rams with the position signal for a second of said rams and comparing the resulting combination with a reference signal to produce a first primary analog deviation signal and operating the first ram therewith;
   algebraically combining the position signal for the second ram with the position signal for a third of said rams and comparing the resulting combination with a reference signal to produce a second primary analog deviation signal and operating the third ram therewith;
   algebraically combining said primary deviation signal and comparing the resulting combination with a reference signal to produce an analog secondary deviation signal and operating said second ram therewith; and
   algebraically combining the position signal for the fourth of said rams with the position signal for the third ram and comparing the resulting combination with a reference signal to produce another analog primary deviation signal and operating said fourth ram therewith while also feeding same to said third ram for the operation thereof.

3. The method defined in claim 2 wherein all of said primary deviation signals are amplified, said method comprising the step of amplifying the second primary deviation signal to a greater extent than the other primary deviation signals.

4. An apparatus for synchronizing at least three rams each controlled by a respective servovalve said apparatus comprising:
   at least three position-sensing means each connected to a respective ram for generating an analog signal representing the position of the respective ram;
   first circuit means for algebraically combining the position signal for a first of said rams with the position signal for a second of said rams, and a first comparator connected to said first circuit means for comparing the resulting combination with a reference signal to produce a first analog primary deviation signal and operating the first ram therewith through the respective servovalve;
   second circuit means for algebraically combining the position signal for the second ram with the position signal for a third of said rams, and a second comparator connected to said second circuit means for comparing the resulting combination with a reference signal to produce a second primary analog deviation signal and operating the third ram therewith through the respective servovalve; and
   third circuit means for algebraically combining said primary deviation signals and a third comparator connected to said third circuit means for comparing the resulting combination with a reference signal to produce a secondary analog deviation signal and operating said second ram therewith through the respective servovalve.

5. An apparatus for synchronizing at least four rams each controlled by a respective servovalve, said apparatus comprising:
   at least four position-sensing means each connected to a respective ram for generating an analog signal representing the position of the respective ram;
   first circuit means for algebraically combining the position signal for the first of said rams with the position signal for the second of said rams, and a first comparator connected to said first circuit means for comparing the resulting combination with a reference signal to produce a first analog primary deviation signal operating the first ram through the respective servovalve;
   second circuit means for algebraically combining the position signal for the second ram with the position signal for a third of said rams, and a second comparator connected to said second circuit means for comparing the resulting combination with a reference signal to produce a second primary deviation signal operating the third ram through the respective servovalve;
   third circuit means for algebraically combining said primary deviation signals, and a third comparator connected to said third circuit means for comparing the resulting combination with a reference signal and producing a secondary deviation signal operating said second ram through the respective servovalve;
   fourth circuit means for algebraically combining the position signal for the third ram with the position signal for the fourth of said rams, and a further comparator connected to said fourth circuit means for comparing the resulting combination with a reference signal to produce a third primary deviation signal operating the fourth ram through the respective servovalve; and
   means for feeding said third primary deviation signal to said third ram for operating same in part therewith, each of said position-sensing means generating direct-current voltage signals, said position signals for said first and third rams being of one polarity and the position signal for said second ram being of the opposite polarity.

6. The apparatus defined in claim 5, further comprising amplifying means for amplifying each of said deviation signals prior to using same for operation of the respective servovalves, said amplifying means for the deviation signal formed of the position signals for said second and third rams having a higher gain than the other amplifier means.

* * * * *